United States Patent [19]

Fukawa et al.

[11] Patent Number: 5,225,526
[45] Date of Patent: Jul. 6, 1993

[54] STABILIZED AROMATIC POLYCARBONATE COMPOSITION AND PROCESS FOR PRODUCING SAME

[75] Inventors: Isaburo Fukawa; Haruyuki Yoneda; Hiroshi Hachiya, all of Kurashiki, Japan

[73] Assignee: Asahi Kasei Kogyo Kabushiki Kaisha, Osaka, Japan

[21] Appl. No.: 667,398
[22] PCT Filed: Aug. 15, 1990
[86] PCT No.: PCT/JP90/01037
 § 371 Date: Mar. 29, 1991
 § 102(e) Date: Mar. 29, 1991
[87] PCT Pub. No.: WO91/02771
 PCT Pub. Date: Mar. 7, 1991

[30] Foreign Application Priority Data

Aug. 17, 1989 [JP] Japan .................................. 1-210705
Aug. 18, 1989 [JP] Japan .................................. 1-211454
Aug. 23, 1989 [JP] Japan .................................. 1-214988

[51] Int. Cl.⁵ ............................ C08K 5/15; C08K 5/51
[52] U.S. Cl. ............................ 524/119; 524/120; 524/126; 524/128; 524/147; 524/151; 524/152; 524/291
[58] Field of Search ............... 524/119, 120, 126, 147, 524/151, 291, 152, 128

[56] References Cited

U.S. PATENT DOCUMENTS

| | | | |
|---|---|---|---|
| 3,809,676 | 5/1974 | Liberti | 524/147 |
| 4,076,686 | 2/1978 | Calkins | 524/147 |
| 4,088,709 | 5/1978 | Seymour et al. | 524/120 |
| 4,093,588 | 6/1978 | Spirack et al. | 524/120 |
| 4,762,873 | 8/1988 | Miyauchi et al. | 524/147 |

FOREIGN PATENT DOCUMENTS

2345487 3/1977 France .
1078772 8/1967 United Kingdom .

OTHER PUBLICATIONS

Patent Abstracts of Japan, vol. 10, No. 166 (C-353) Jun. 13, 1986.
Patent Abstracts of Japan, vol. 1, No. 9 (C-002), Mar. 17, 1977.
WPIL Database, Accession No. 88-060413, Derwent Publication Ltd.

*Primary Examiner*—Kriellion S. Morgan
*Attorney, Agent, or Firm*—Jacobson, Price, Holman & Stern

[57] ABSTRACT

The present invention relates to an aromatic polycarbonate composition which is stabilized by adding to an aromatic polycarbonate (containing substantially no chlorine atom) a very slight amount of at least one compound selected from a phosphorous acid diester and a phosphorous acid monoester and at least one compound selected from a phenolic antioxidant, a phosphorous acid triester and an organic phosphonite. This composition has the characteristics that molded products made therefrom are superior in hot-water resistance and steam resistance and recycling molding thereof causes substantially no coloration. Thus, this composition is high in industrial applicability.

13 Claims, 1 Drawing Sheet

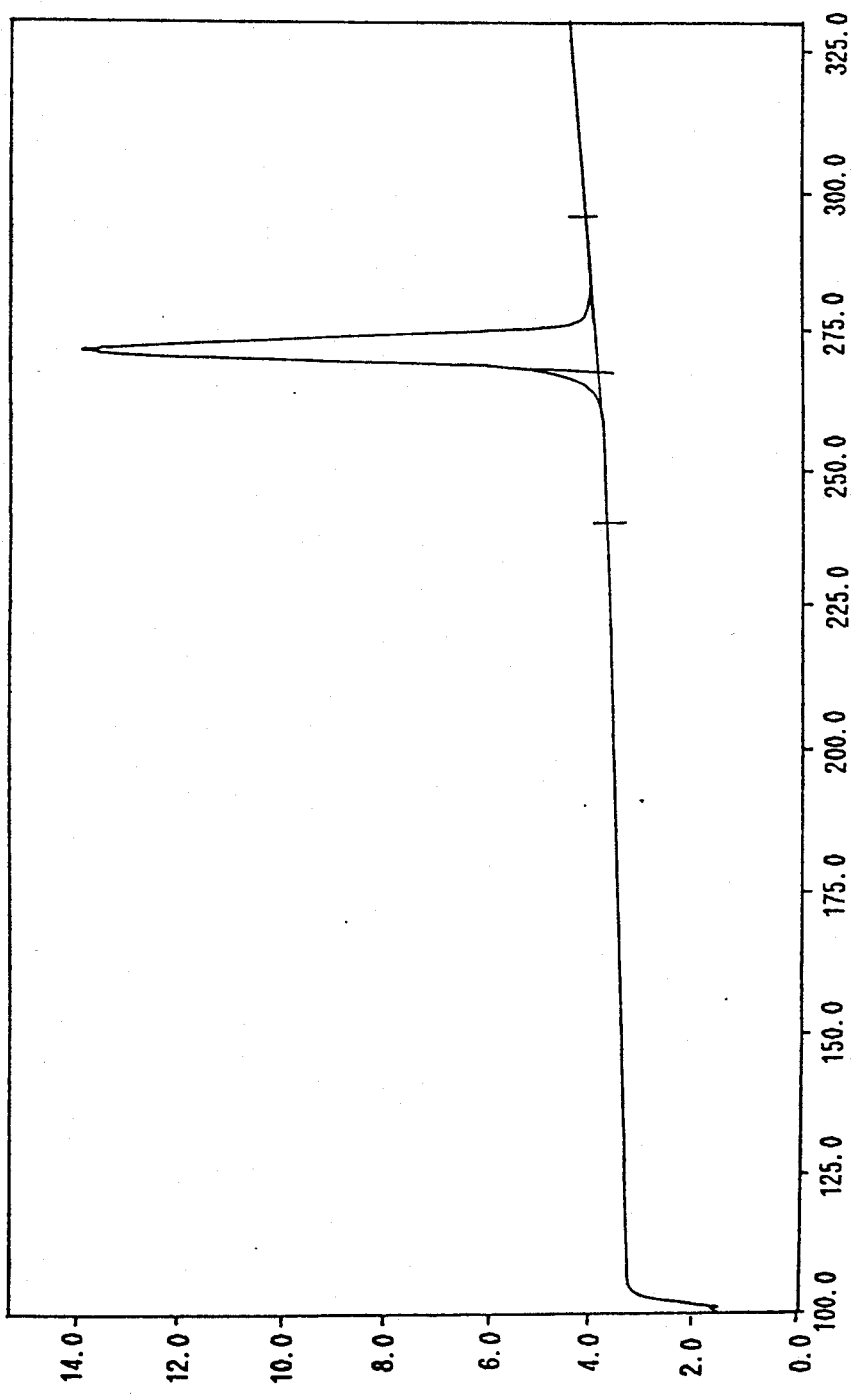
FIG. I

STABILIZED AROMATIC POLYCARBONATE COMPOSITION AND PROCESS FOR PRODUCING SAME

TECHNICAL FIELD

The present invention relates to a stabilized composition of aromatic polycarbonate which is an engineering plastic.

BACKGROUND ART

Aromatic polycarbonate, generally produced by a phosgene process or a melt process, has shortcomings such as coloration and reduction of molecular weight at the time of melt molding with heating, and addition of heat stabilizers has been known to inhibit these phenomena. As heat stabilizers, various phosphorous acid triesters, epoxy compounds and hindered phenolic compounds are used. The phosphorous triester compounds include, for example, tris(nonylphenyl) phosphite and tris(2,4-di-t-butylphenyl) phosphite. Furthermore, tetrakis(2,4-di-t-butylphenyl) 4,4'-biphenylenephosphonite is similarly used. The amount of heat stabilizer added is usually 0.02-1 part by weight per 100 parts by weight of polycarbonate.

Addition of phosphorous acid diesters is also known.

For example, compositions of aromatic polycarbonate and phosphorous acid diester are reported in Japanese Patent Kokoku No. Sho 37-13775 and preferred amount of phosphorous acid diester added is said to be 0.02-5 parts by weight per 100 parts by weight of aromatic polycarbonate.

Moreover, compositions of aromatic polycarbonate and phosphorous acid diester are reported in Japanese Patent Kokai No. Sho 47-12993. In this case, a chlorine atom containing aromatic polycarbonate is obtained by polymerization. A phosgene process is used, and preferred amount of phosphorous acid diester added to the polycarbonate is said to be 0.01-2.0 parts by weight per 100 parts by weight of polycarbonate.

However, although these phosphorous acid ester type heat stabilizers have a conspicuous effect on heat stability for a short period in melt processing, they still result in deficiencies, such as coloration and adverse effects on recycling molding, hydrolysis resistance of molded articles to hot water and steam and coloration of polymer at heat aging for a long period. These adverse effects depend on the amount of heat stabilizer added and, with an increase in such amount, hot water resistance deteriorates and the degree of polymer coloration increases.

Furthermore, Japanese Patent Kokai No. Sho 62-235357 discloses a process for improving hydrolysis resistance. According to this the amount of phosphorus compound added depends on the amount of chloride remaining in polymer. Also, the amount of remaining alkali metal or alkaline earth metal depends on the amount of phosphorus compound.

In the examples, 0.0037-0.0048 part by weight of chlorine atoms remained in 100 parts by weight of polycarbonate obtained by phosgene process, and from 0.0040 to 0.012 part by weight of organic phosphine or phosphorous acid triester as a phosphorus compound, is added thereto.

This patent publication indicates that hydrolysis resistance is improved by the process. However, a trace trial conducted by using the same blending amounts revealed that improvement in heat resistance is inadequate, and coloration is serious when recycling molding is carried out.

Moreover, Japanese Patent Kokai No. Sho 58-89648 can be referred to as a process of adding phosphorus compound.

This patent publication discloses a composition comprising polycarbonate, to which an organic phosphorous acid ester and an organometallic compound are added, and states that, when organic phosphorous acid ester or organometallic compound is singly added to polycarbonate, superior heat stability and hydrolysis resistance cannot be obtained.

In the examples thereof, from 0.04 to 0.05 part by weight of phosphorous acid triester and from 0.01 to 0.05 part by weight of organometallic compound were added to 100 parts by weight of polycarbonate obtained by phosgene process.

In comparative examples thereof, organic phosphorous acid ester was added alone and a large amount, namely, from 0.04 to 0.05 part by weight, of a phosphorous acid triester was added to 100 parts by weight of polycarbonate obtained by polymerization according to a phosgene process.

The patent publication mentions, that according to this process, retention of molecular weight in heat resistance test and in a hot water resistance test is good, but testing with the same blending amount revealed that molded pellets were colored and coloration due to recycling molding was great.

As mentioned above, polycarbonate prepared industrially by a phosgene process contains at least 0.005 part by weight of chlorine per 100 parts by weight of polycarbonate (Japanese Patent Kokoku No. Sho 59-22743). Various stabilizers have been added to this polycarbonate containing chlorine. However, there have not yet been obtained any stabilized compositions which are free from all of the noted problems: heat resistance, hot water resistance and coloration in recycling molding.

On the other hand, it is difficult to produce, on an industrial scale by a melt process, aromatic polycarbonates which are colorless and transparent, and particularly with out sacrificing strength in properties. ("KOBUNSHI (Polymer)", Vol. 27, Page 521, 1978). Hitherto, it has been difficult to obtain colorless and transparent polycarbonates by a melt process.

Even when stabilizers are added to these polycarbonates, improvement in heat resistance and hot water resistance has not been sufficient.

Thus, no polycarbonates have been known which satisfy all of heat resistance, hot water resistance and recycling moldability.

DISCLOSURE OF INVENTION

The present invention provides a novel aromatic polycarbonate composition which encounters very little in coloration in recycling molding and is excellent in hot water resistance and heat aging resistance.

The inventors have found that the above object can be attained by adding to aromatic polycarbonate containing substantially no chlorine atoms, at least one compound selected from phosphorous acid diesters and phosphorous acid monoesters in an unexpectedly slight amount and at least one compound selected from phenolic antioxidants, phosphorous acid triesters and organic phosphonites. Thus, the present invention has been accomplished. That is, the present invention provides a stabilized aromatic polycarbonate composition which comprises 100 parts by weight of an aromatic polycarbonate containing substantially no chlorine atom and the following components (a) and (b):

(a) from 0.0005 to 0.015 part by weight of at least one compound selected from phosphorous acid diesters and phosphorous acid monoesters and (b) from 0.0005 to 0.1 part by weight of at least one compound selected from phenolic antioxidants, phosphorous acid triesters and organic phosphonites. The present invention further provides a process for producing the aromatic polycarbonate composition.

BRIEF EXPLANATION OF DRAWING

FIG. 1 is a DSC chart of the aromatic polycarbonate obtained in Example 1. The melting point of the polycarbonate was 271° C. and half width was 4.3° C.

BEST MODE FOR CARRYING OUT THE INVENTION

The present invention will be explained in detail.

The aromatic polycarbonate used in the present invention is represented by the formula:

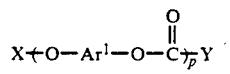
(I)

wherein $Ar^1$ represents a divalent aromatic residue and p represents an integer).

Such aromatic residue includes, for example, phenylene (of all sorts), naphthylene (of all sorts), biphenylene (of all sorts), pyridylene (of all sorts), and divalent aromatic residues represented by the formula:

$$-Ar^2-Z-Ar^3-$$ (II)

In the formula (II), $Ar^2$ and $Ar^3$ are divalent aromatic groups which may be identical or different and include, for example, phenylene (of all sorts), naphthylene (of all sorts), biphenylene (of all sorts), and pyridylene (of all sorts). Z represents a single bond or a divalent group, such as —O—, —CO—, —S—, —SO$_2$—, —CO$_2$—, —CON(R$^1$)—,

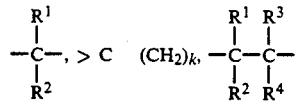

(wherein $R^1$, $R^2$, $R^3$, and $R^4$, which may be identical or different, each represents a hydrogen atom, a lower alkyl group, a lower alkoxy group or a cycloalkyl group, and k represents an integer of 3–11).

Furthermore, at least one hydrogen atom in these divalent aromatic groups (namely, $Ar^1$ or $Ar^2$, $Ar^3$) may be substituted with other substituents which have no adverse effect on the reaction, such as lower alkyl group, lower alkoxy group, phenyl group, phenoxy group, vinyl group, cyano group, ester group, amide group, and nitro group.

As such aromatic groups, mention may be made of, for example, substituted or unsubstituted phenylene groups represented by

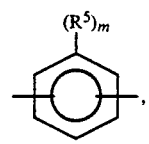

substituted or unsubstituted biphenylene groups represented by

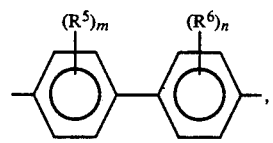

substituted or unsubstituted aromatic groups represented by

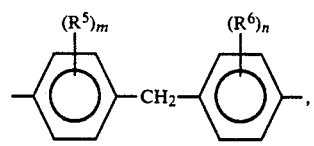

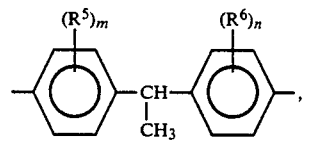

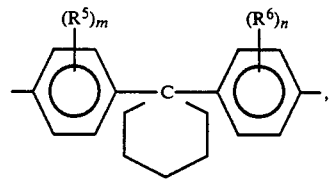

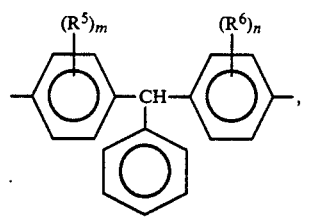

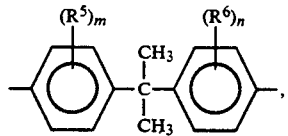

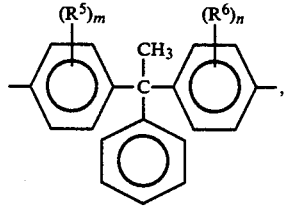

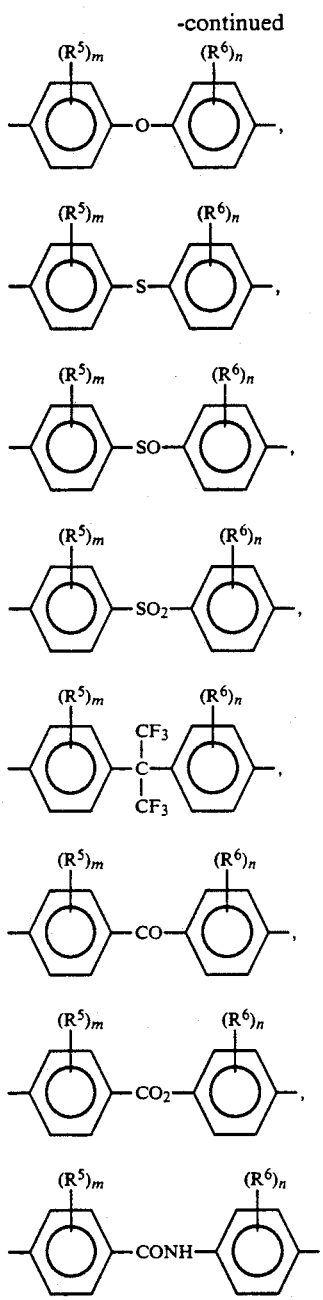

(in the formula, $R^5$ and $R^6$ each represents a hydrogen atom, a lower alkyl group of 1-4 carbon atoms, a lower alkoxy group of 1-4 carbon atoms, a cycloalkyl group or a phenyl group and these may be identical or different, m and n each represents an integer of 1-4 and, when m is 2 or more, $R^5$ may be different, and when n is 2 or more, $R^6$ may be different).

Among these structures,

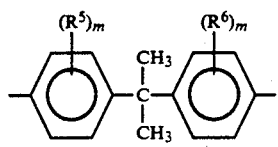

is preferred as $Ar^1$.

Furthermore, those which contain 85 mol % or more of the repeating unit represented by the following formula are preferred.

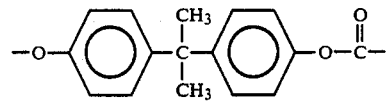

X is —H or

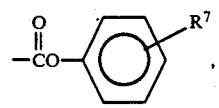

Y is —O—$Ar^1$—OH or

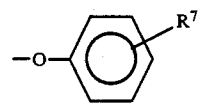

wherein $R^7$ represents hydrogen, an alkyl group, an aralkyl group, an alkoxy group, or the like and examples are as follows:

$R^7$= —H, —$CH_3$,

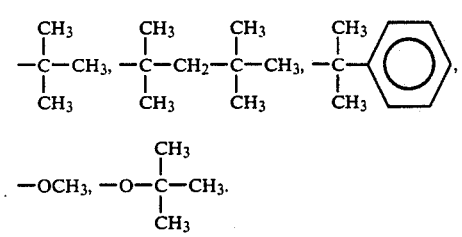

The polycarbonates also include those which have branched structure containing a small amount of substituted or unsubstituted tri- or higher- valent aromatic group.

Moreover, as far as the effect of the present invention is not deteriorating, the main chain structure may contain ester bond.

The polycarbonates contain substantially no chlorine atom and specifically (i) contain chloride ion in an amount of 0.00005% by weight or less measured by the method for measurement of chloride ion by potentiometric titration method using $AgNO_3$ solution and, at the same time, (ii) contain chlorine atoms in an amount of at most 0.001% by weight, which is a detection limit (measured by a method for measurement of chlorine atom by combustion method), and preferably (i) contain chloride ion in an amount of at most 0.00001% by weight, which is a detection limit for the noted method and, at the same time, (ii) contain chlorine atoms in an amount of at most 0.001% by weight. Aromatic polycarbonates produced by any processes can be used as far as they contain substantially no chlorine atoms.

However, those aromatic polycarbonates are not preferred which have an absorbance of 0.01 or more at 400 nm, which is measured by a spectrophotometer using a solution of 1.0 g of the polycarbonate in 7 ml of methylene chloride (which is put in a cell of 1 cm in length of optical path).

Aromatic polycarbonates of more than 0.01 in absorbance is colored and not only is inferior in initial color when molded, but also is inferior in heat resistance and is heavily colored by recycling molding.

The process for production of polycarbonates containing substantially no chlorine has no special limitation and typical examples thereof are as follows.

One of them is a process disclosed in Japanese Patent Kokai Nos. Hei 1-158033 and 1-271426.

According to these processes, an amorphous aromatic polycarbonate prepolymer is crystallized to obtain a crystalline aromatic polycarbonate prepolymer, and this crystalline aromatic polycarbonate prepolymer is subjected to solid-phase polymerization to obtain an aromatic polycarbonate.

When the amorphous aromatic polycarbonate prepolymer is prepared by transesterification process, this prepolymer is, as it is, subjected to crystallization and solid-phase polymerization to obtain an aromatic polycarbonate containing substantially no chlorine.

When the amorphous aromatic polycarbonate prepolymer is prepared by a phosgene process, this prepolymer is sufficiently purified and then subjected to solid phase polymerization to obtain an aromatic polycarbonate containing substantially no chlorine.

In this case, the purification of prepolymer can be easily carried out since the prepolymer is of low molecular weight.

The solid-phase polymerization can be effected in the presence or absence of catalyst, but non-catalyzed polymerization is preferred because the resulting polymer is much superior in color characteristics, heat resistance and hot water resistance.

Known catalyst employed for preparation of polycarbonates and polyesters, such as transesterification catalyst, may be used as polymerization catalyst. Examples thereof are alkali metal salts of bisphenol A and compounds of tin, lead and the like.

Aromatic polycarbonates obtained by solid-phase polymerization can be clearly distinguished from those which are obtained by a conventional phosgene process or a melt process because the former are highly crystalline polymers having a high crystal melting point and a sharp melting point.

Since the aromatic polycarbonate of the present invention is obtained by solid-phase polymerization of crystalline aromatic polycarbonate prepolymer, and so the polymer is annealed at the time of heating in solid-phase polymerization, the melting point measured by differential scanning calorimeter (DSC) increases and besides, peak of melting point is sharp.

Crystalline melting point (peak top of DSC) is 230°-300° C. and half width of melting point peak is 3°-8° C. Measurement by DSC was conducted under the conditions of inert atmosphere, a heating rate of 10° C./min, and sample amount of 5-10 mg.

Another process for obtaining aromatic polycarbonate containing substantially no chloride comprises thoroughly purifying the aromatic polycarbonate obtained by phosgene process.

According to Japanese Patent Kokoku No. Sho 59-22743, aromatic polycarbonate obtained by phosgene process can be purified to chlorine content of 0.005-0.2% by weight without employing any step which is difficult to carry out.

However, aromatic polycarbonates which have been purified to such an extent that chlorine is substantially not contained by repetition of extraction purification with solvent containing no chlorine, vacuum drying of a long time or treatment of polycarbonate solution with an ion exchange resin can also be used in the present invention.

Furthermore, it is possible to obtain aromatic polycarbonate containing substantially no chlorine atoms by using transesterification process.

However, as aforementioned, those which have an absorbance of less than 0.01 to 400 nm are preferred to be used in the present invention. It is considered that aromatic polycarbonates which are low in absorbance, namely: less in coloration, have fewer side reaction during polymerization and have further excellent in heat resistance and hot water resistance.

Aromatic polycarbonates containing substantially no chlorine atoms may be those which are produced by any of the above-mentioned processes.

Among them, the process which uses solid-phase polymerization is preferred in that the process per as is simple, and quality of the resulting aromatic polycarbonates is superior.

Molecular weight of the aromatic polycarbonates has no special limitation as far as they can be melt molded under heating, but is usually 5,000-1,000,000 in weight-average molecular weight and 10,000-500,000 is preferred for molding.

The phosphorous acid diesters are those which have a structure in which two hydrogen atoms of phosphorous acid ($H_2PHO_3$) are substituted with hydrocarbon groups. Examples of them are phosphorous acid diesters represented by the formula:

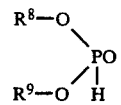

(wherein $R^8$ and $R^9$ each represents an alkyl group, an aryl group or an alkylaryl group).

The alkyl group in the above formula includes, for example, ethyl group, butyl group, octyl group, cyclohexyl group, 2-ethylhexyl group, decyl group, tridecyl group, lauryl group, pentaerythritol group, and stearyl group. The aryl group includes, for example, phenyl group and naphthyl group.

The alkylaryl group includes, for example, tolyl group, p-t-butylphenyl group, 2,4-di-t-butylphenyl group, 2,6-di-t-butylphenyl group, p-nonylphenyl group and dinonylphenyl group.

Preferred examples are diphenyl hydrogen phosphite ($R^8$, $R^9$: phenyl), bis(nonylphenyl) hydrogen phosphite ($R^8$, $R^9$: nonylphenyl), bis(2,4-di-t-butylphenyl) hydrogen phosphite, dicresyl hydrogen phosphite, bis(p-t-butylphenyl) hydrogen phosphite, and bis(p-hexylphenyl) hydrogen phosphite.

Phosphorous acid diesters other than those which are represented by the above formula can also be used in the present invention.

For example, phosphorous acid diesters containing two phosphorous atoms represented by the following formula can also be used.

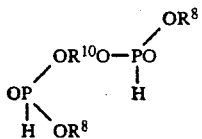

(wherein R⁸ is the same as defined above and R¹⁰ represents an alkylene group, an arylene group or an arylalkylene group).

Moreover, those which are represented by the following formula can also be used.

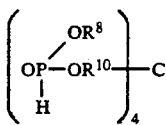

(wherein R⁸ and R¹⁰ are the same as defined above).

Of these phosphorous acid diesters, preferred are aromatic phosphorous acid diesters. Especially preferred are diphenyl hydrogen phosphite, bis(nonylphenyl) hydrogen phosphite, bis(2,4-di-t-butylphenyl) hydrogen phosphite, and the like.

These phosphorous acid diesters may be used singly or in admixture.

The phosphorous acid monoesters have such structure that one hydrogen atom or phosphorous acid (H₂PHO₃) is substituted with a hydrocarbon group. Examples of these phosphorous acid monoesters are those which are represented by the formula: R⁸—O—P(OH)₂ (wherein R⁸ is the same as defined above).

Examples of the alkyl group in the above formula are ethyl group, butyl group, octyl group, cyclohexyl group, 2-ethylhexyl group, decyl group, tridecyl group, lauryl group, pentaerythritol group, and stearyl group. Examples of the aryl group are phenyl group and naphthyl group.

Examples of the alkylaryl group are tolyl group, p-t-butylphenyl group, 2,4-di-t-butylphenyl group, 2,6-di-t-butylphenyl group, p-nonylphenyl group, and dinonylphenyl group.

Preferred examples are phenyl dihydrogen phosphite (R⁸: phenyl), nonylphenyl dihydrogen phosphite (R⁸: nonylphenyl), and 2,4-di-t-butylphenyl dihydrogen phosphite.

These compounds may be used singly or in admixture.

The phenolic antioxidants are represented by the following formula:

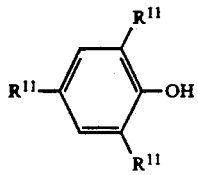

(wherein R¹¹ represents a hydrogen atom, a hydroxyl group, an alkoxyl group or a hydrocarbon residue which may have a substituent and these R¹¹ may be identical or different, with a proviso that at least one of R¹¹ represents a hydrocarbon residue which may have a substituent).

Examples thereof are 2,6-di-t-butyl-p-cresol, 2,6-di-t-butyl-p-anisole, 2,6-di-t-butyl-4-ethylphenol, 2,2'-methylenebis(6-t-butyl-p-cresol), 2,2'-methylenebis-(4-ethyl-6-t-butylphenol), 4,4'-methylenebis(6-t-butyl-o-cresol), 4,4'-butylidenebis(6-t-butyl-m-cresol), tetrakis-[methylene-3-(3',5'-di-t-butyl-4'-hydroxyphenyl)propionate]methane, 4,4'-thiobis(6-t-butyl-m-cresol), stearyl-β-(3,5-di-t-butyl-4-hydroxyphenyl) propionate, 1,3,5-trimethyl-2,4,6-tris(3,5-di-t-butyl-4-hydroxybenzyl)benzene, 1,1,3-tris(2-methyl-4-hydroxy-5-t-butylphenyl)butane, and triethylene glycol-bis[3-(3-t-butyl-5-methyl-4-hydroxyphenyl)propionate].

Preferred phenolic antioxidants are represented by the following formula:

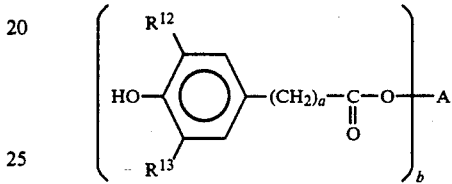

(wherein R¹² represents a methyl group or a t-butyl group, R¹³ represents a t-butyl group, A represents a hydrocarbon or heterocyclic residue having a valence of b and 1–30 carbon atoms, a represents an integer of 1–4 and b represents an integer of 1 or more).

Examples thereof are tetrakis-[methylene-3-(3',5'-di-t-butyl-4'-hydroxyphenyl)propionate]methane (Irganox 1010 manufactured by Ciba-Geigy Corp.), stearyl-β-(3,5-di-t-butyl-4-hydroxyphenyl) propionate (Irganox 1076 manufactured by Ciba-Geigy Corp.), and triethylene glycol-bis[3-(3-t-butyl-5-methyl-4-hydroxyphenyl) propionate].

Furthermore, phenolic antioxidants containing P atom can also be used. Examples thereof are 3,5-di-t-butyl-4-hydroxybenzylphosphonate-diethyl ester (Irganox 1222 manufactured by Ciba-Geigy Corp.) and bis(ethyl-3,5-di-t-butyl-4-hydroxybenzylphosphonate)-calcium (Irganox 1245ML manufactured by Ciba-Geigy Corp.). These phenolic antioxidants may be used singly or in admixture.

The phosphorous acid triesters have such a structure that three hydrogen atoms of phosphorous acid are substituted with hydrocarbon groups and examples thereof are those which are represented by the following formula:

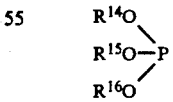

(wherein R¹⁴, R¹⁵ and R¹⁶ which may be identical or different each represents an alkyl group, an aryl group or an alkylaryl group).

Examples of the alkyl group in the above formula are ethyl group, butyl group, octyl group, cyclohexyl group, 2-ethylhexyl group, decyl group, tridecyl group, lauryl group, pentaerythritol group and stearyl group.

Examples of the aryl group are phenyl group and naphthyl group.

Examples of the alkylaryl group are tolyl group, p-t-butylphenyl group, 2,4-di-t-butylphenyl group, 2,6-di-t-butylphenyl group, p-nonylphenyl group, and dinonylphenyl group.

Preferred examples are tris(2,4-di-t-butylphenyl) phosphite, tris(nonylphenyl) phosphite, tris(dinonylphenyl) phosphite, and triphenyl phosphite.

Furthermore, phosphorous acid triesters represented by the following formula may also be used.

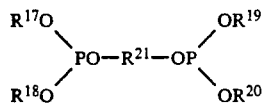

(wherein $R^{17}$, $R^{18}$, $R^{19}$ and $R^{20}$ may be identical or different and each represents an alkyl group, an aryl group or an alkylaryl group and $R^{21}$ represents an alkylenearylene group or an arylalkylene group).

Examples thereof are tetraphenyldipropylene glycol diphosphite and tetra(tridecyl) 4,4'-isopropylidenediphenyl diphosphite.

Furthermore, phosphorous acid triesters represented by the following formula may also be used.

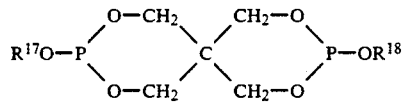

(wherein $R^{17}$ and $R^{18}$ are the same as defined above).

Examples thereof are bis(tridecyl)pentaerythritol diphosphite, bis(nonylphenylpentaerythritol)diphosphite, bis(2,4-di-t-butylphenyl)pentaerythritoldiphosphite, bis(2,6-di-t-butyl-4-methylphenyl)pentaerythritoldiphosphite, distearylpentaerythritol diphosphite, and hydrogenated bisphenol A.pentaerythritol phosphite polymer.

Moreover, phosphorous acid triesters represented by the following formula may also be used.

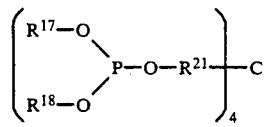

(wherein $R^{17}$, $R^{18}$ and $R^{21}$ and the same as defined above).

Examples thereof are tetraphenyltetra(tridecyl)pentaerythritol tetraphosphite.

These may be used singly or in admixture.

Those which have 2,4-di-t-butylphenyl group or 2,6-di-t-butylphenyl group improve hydrolysis resistance of the composition and are especially preferred. Examples thereof are tris(2,4-di-t-butylphenyl) phosphite, bis(2,4-di-t-butylphenyl)pentaerythritol diphosphite, and bis(2,6-di-t-butyl-4-methylphenyl)pentaerythritol diphosphite.

The organic phosphonites have the structure that one hydroxyl group of phosphorous acid $P(OH)_3$ is substituted with a hydrocarbon group and furthermore, the remaining two hydrogen atoms are substituted with hydrocarbon groups. Examples thereof are those which are represented by the following formula:

(wherein $R^{22}$, $R^{23}$ and $R^{24}$ may be identical or different and each represents an alkyl group, an aryl group or an alkylaryl group). Examples of the alkyl group in the above formula are ethyl group, butyl group, octyl group, cyclohexyl group, decyl group, tridecyl group, lauryl group and stearyl group.

Examples of the aryl group are phenyl group and naphthyl group.

Examples of the alkylaryl group are tolyl group, p-t-butylphenyl group, 2,4-di-t-butylphenyl group, p-nonylphenyl group and dinonylphenyl group.

Examples of organic phosphonites other than those of the above formula are organic phosphonites having two phosphorous atoms which are represented by the following formula:

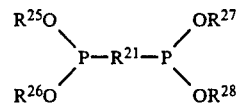

(wherein $R^{25}$, $R^{26}$, $R^{27}$ and $R^{28}$ may be identical or different and each represents an alkyl group, an aryl group or an alkylaryl group and $R^{21}$ is the same as defined above).

An example of such compound is tetrakis-(2,4-di-t-butylphenyl) 4,4'-biphenylenediphosphonite. These may be used singly or in admixture.

The amount of at least one compound selected from phosphorous acid diesters and phosphorous acid monoesters is 0.0005–0.015 part by weight, more preferably 0.0005–0.009 part by weight per 100 parts by weight of aromatic polycarbonate.

When the amount of at least one compound selected from phosphorous acid diesters and phosphorous acid monoesters is less than 0.0005 part by weight, heat resistance and hot-water resistance are deteriorated; when it is more than 0.015 part by weight, coloration in recycling molding and coloration in heat resistance test increase and, besides, hot water resistance is deteriorated.

By adding the following compounds to aromatic polycarbonate and at least one compound selected from phosphorous acid diesters and phosphorous acid monoesters, the following effects are obtained.

1) By adding the phenolic antioxidant, coloration in recycling molding and coloration in long-term heat aging test can be diminished and tensile elongation retention rate can be improved. Addition amount is 0.0005–0.1 part by weight, preferably 0.0005–0.07 part by weight, more preferably 0.001–0.05 part by weight per 100 parts by weight of the aromatic polycarbonate.

When the amount added is more than 0.1 part by weight, coloration in the long-term heat aging test rather becomes heavier and this is not preferred.

The effect of addition of the phenolic antioxidant becomes clear at 0.0005 part by weight or more.

2) By adding the phosphorous acid triesters and/or organic phosphonites, coloration at molding and recycling molding can be diminished without causing reduction in hot-water resistance of the composition, and long-term heat aging resistance can be improved.

Addition amount is 0.0005–0.1 part by weight, preferably 0.0005–0.07 part by weight, more preferably 0.001–0.05 part by weight per 100 parts by weight of the aromatic polycarbonate.

When the amount is more than 0.1 part by weight, hot-water resistance deteriorates, and this is not preferred. The effect of addition becomes clear at 0.0005 part by weight or more.

3) By simultaneous addition of the phenolic antioxidant and the phosphorus compound selected from phosphorous acid triester and/or organic phosphonite, coloration of the composition in long-term heat aging test can be diminished, as compared with a single addition of the phenolic antioxidant or the phosphorus compound; a synergistic effect is recognized, and this is especially preferred.

Coloration at recycling molding also diminishes. The total amount of the phenolic antioxidant and the phosphorus compound added is 0.0005–0.1 part by weight, preferably 0.0005–0.07 part by weight, more preferably 0.001–0.05 part by weight per 100 parts by weight of the aromatic polycarbonate.

The ratio of the phenolic antioxidant and the phosphorus compound has no special limitation, but the range in which the synergistic effect is conspicuous is 1:5–5:1 by weight ratio of the phenolic antioxidant and the phosphous compound.

When the total added amount exceeds 0.1 part by weight, reduction of hot-water resistance and coloration in long-term heat aging test become conspicuous, and this is not preferred.

The effect of the addition becomes clear at 0.0005 part by weight or more.

It is important to uniformly mix the components to prepare the composition. It is preferred to make them uniform previously by Henschel mixer, Nauter mixer, tumbler and the like.

The composition of the present invention obtained by mixing the components, may be molded, as it is, by injection molding, extrusion molding and the like, but usually is pelletized by extruder to make uniform aromatic polycarbonate composition and then, this is subjected to injection molding, extrusion molding and the like.

When the amount of additives is small, the additives may be once diluted with solvents, such as acetone, and acetone may be removed by drying after they are incorporated in the polymer.

The aromatic polycarbonate composition of the present invention has the characteristics that it is superior in color, lower in coloration and lower in deterioration of mechanical properties in heat resistance test, lower in coloration in recycling molding, and lower in reduction of molecular weight and in deterioration of mechanical properties in hot-water resistance test. That is, the composition of the present invention is an aromatic polycarbonate composition which is superior in all of heat resistance, hot-water resistance and recycling properties.

EXAMPLE

The present invention will be explained in more detail by the following examples, but is never limited by these examples.

Measurements were conducted by the following methods.

1. Color: This was measured by CIELAB method. Thickness of test piece was 3.0 mm.

2. Heat resistance test: A test piece (ASTM No. 4 dumbbell) was placed in Geer oven at 140° C. for a given period and thereafter, color and tensile elongation (ASTM D-638) of the test piece were measured.

3. Hot-water resistance test: A test piece was dipped in boiling water for a given period and then was taken out and molecular weight, tensile elongation (ASTM D-638), and Izod value with a thickness of 3.0 mm (ASTM D-256) of the test piece were measured.

4. Recycling test: A cycle consisting of grinding a test piece obtained by injection molding by a grinder, drying the powder and injection molding the powder was repeated five times. Color and tensile elongation of the finally obtained test piece were measured.

5. Molecular weight: Weight-average molecular weight (Mw) and number-average molecular weight (Mn) were measured by GPC (gel permeation chromatography) [RI detector: Shodex RI SE-51 (manufactured by Showa Denko K.K.), column: TSK-GEL (manufactured by Toyo Soda Mfg. Co., Ltd.), solvent: THF].

6. Terminal group in prepolymer: This was determined by analysis according to high performance liquid chromatography or NMR analysis.

PREPARATION OF AROMATIC POLYCARBONATE

1) Preparation of polycarbonate A:

Diphenyl carbonate was prepared from dimethyl carbonate and phenol using lead oxide as a catalyst by the process described in Japanese Patent Kokoku No. Hei 1-3181.

The resulting diphenyl carbonate contained at most 0.00001% by weight of chloride ion and at most 0.001% by weight of chlorine atoms.

A crystalline aromatic polycarbonate prepolymer having a number-average molecular weight of 4,100 and containing terminal groups of 34% of terminal hydroxyl group and 66% of terminal phenyl carbonate group was prepared from the above diphenyl carbonate and bisphenol A. 11 kg of this prepolymer was subjected to solid-phase polymerization using a 70 liter tumbler type solid-phase polymerizer. Under a small amount of nitrogen being incorporated into the system, the polymerization was carried out by elevating the temperature from 180° C. to 220° C. over a period of 6 hours, and then keeping at 220° C. for 5 hours under a reduced pressure of 1–2 Torr, attained by a vacuum pump to obtain an aromatic polycarbonate of Mn=12,500 and Mw=28,000.

The polycarbonate contained at most 0.0001% by weight of chloride ion and at most 0.001% by weight of chlorine atom.

2) Preparation of polycarbonate B:

Solid-phase polymerization was carried out in the same manner as in preparation of polycarbonate A except for using a crystalline aromatic polycarbonate prepolymer having a number-average molecular weight of 4200 and containing terminal groups, 37% of terminal hydroxyl group and 63% of terminal phenyl carbonate group which was prepared from bisphenol A and diphenyl carbonate. An aromatic polycarbonate of Mn=13400 and Mw=33400 was obtained.

The resulting polycarbonate contained at most 0.00001% by weight of chloride ion and at most 0.001% by weight of chlorine atom.

3) Preparation of polycarbonate C:

Diphenyl carbonate containing at most 0.00002% by weight of chloride ion and at most 0.001% by weight of chlorine atoms was obtained by distillation purification of diphenyl carbonate prepared from phenol and phosgene. Solid-phase polymerization of this diphenyl carbonate was carried out in the same manner as in preparation of polycarbonate A except using a crystalline aromatic polycarbonate prepolymer having terminal groups of 28% of terminal hydroxyl group and 72% of terminal phenyl carbonate group. An aromatic polycarbonate of Mn=10100 and Mw=23300 was obtained.

This polycarbonate contained at most 0.00002% by weight of chloride ion and at most 0.001% by weight of chlorine atom.

4) Preparation of polycarbonate D:

The polycarbonate was prepared by the phosgene process.

This polycarbonate had Mn=10800 and Mw=28000 and contained 0.001% by weight of chloride ion and 0.004% by weight of chlorine atom.

5) Preparation of polycarbonate E:

The polycarbonate was prepared by the phosgene process.

This polycarbonate had Mn=9200 and Mw=23000 and contained 0.0008% by weight of chloride ion and 0.003% by weight of chlorine atoms.

6) Preparation of polycarbonate F:

The polycarbonate was prepared by melt process, using bisphenol A and the same diphenyl carbonate as used in preparation of polycarbonate C in 3). As catalyst, sodium salt of bisphenol A was added in an amount of 5 ppm based on bisphenol A. While splitting off phenol which was a condensate, polymerization temperature was gradually raised from 180° C. to finally 310° C. The resulting aromatic polycarbonate had a number-average molecular weight of 10,500 and a weight-average molecular weight of 28,300.

The polycarbonate contained at most 0.00002% by weight of chloride ion and at most 0.001% by weight of chlorine atoms.

1.5 g of this polycarbonate was dissolved in 10 ml of methylene chloride and the solution was charged in a cell of 1 cm in optical path length and light absorbance was measured by a spectrophotometer to obtain 0.013 at 400 nm.

7) Preparation of polycarbonate G:

An aqueous solution prepared by dissolving 64.8 g of sodium hydroxide in 800 g of water, 137 g of 2,2-bis(1-hydroxyphenol)propane, 400 g of methylene chloride and 1.1 g of phenol were mixed to obtain an emulsion. 58.5 g of phosgene was gradually blown into the emulsion over a period of 1 hour at 10°-20° C. with stirring to carry out reaction.

Thereafter, to this reaction mixture was added a solution prepared by dissolving 1.7 g of methyl chloroformate in 40 ml of methylene chloride, and further, 6 g of phosgene was blown thereinto over a period of 5 minutes. Thereafter, 0.15 g of triethylamine was added thereto, followed by stirring for 2 hours. Then, the reaction mixture was separated to take out a methylene chloride phase containing prepolymer, which was washed with 0.1N aqueous hydrochloride acid solution, and then was sufficiently washed with distilled water until chloride ion was no longer detected in the washing liquid. Methylene chloride was distilled off under reduced pressure at room temperature to obtain a prepolymer containing about 100% by weight of methylene chloride. Then, this prepolymer was thrown into 2 liters of acetone and the mixture was stirred and filtrated to take out prepolymer powder, which was washed with acetone until no chloride ion and no chlorine atoms were detected in the washing acetone. The resulting prepolymer crystallized and had a crystallinity of 15% and a weight-average molecular weight of 6,300.

Then, the thus obtained prepolymer was charged in a flask of a vacuum evaporator with a heating over and the prepolymer was heated from 190° C. at 5° C./hr. Reaction was allowed to process with adding thereto dried nitrogen under reduced pressure of 2-5 mmHg under stirring by rotating the flask. After the temperature reached 220° C., the reaction was allowed to proceed for further 7 hours to obtain a polycarbonate having a weight-average molecular weight of 27,000 (Mw/Mn=2.23).

The polycarbonate contained at most 0.00003% by weight of chloride ion and at most 0.001% by weight of chloride atom.

8) Preparation of polycarbonate H:

Solid-phase polymerization was carried out in the same manner as in preparation of polycarbonate A except using a crystalline aromatic polycarbonate prepolymer prepared from bisphenol A, 0.4 mol % (based on the bisphenol A) of α,α',α''-tris(4-hydroxyphenyl)-1,3,5-triisopropylbenzene, and diphenyl carbonate. An aromatic polycarbonate of Mn=13000 and Mw=36000 was obtained.

This polycarbonate contained at most 0.00001% by weight of chloride ion and at most 0.001% by weight of chlorine atom.

9) Preparation of polycarbonate I:

Solid-phase polymerization was carried out in the same manner as in preparation of polycarbonate A, except using bisphenol A, diphenyl carbonate and 0.0002 mol % (based on the bisphenol A) of sodium phenolate. An aromatic polycarbonate of Mn=12400 and Mw=27900 was obtained.

This polycarbonate contained at most 0.00001% by weight chloride ion and at most 0.001% by weight of chlorine atom.

10) Preparation of polycarbonate J:

Polymerization was carried out in the same manner as in Example 1 except using diphenyl carbonate prepared using phenol and phosgene and subjected to simple distillation.

An aromatic polycarbonate of Mn=12400 and Mw=27900 was obtained.

The polycarbonate contained at most 0.0002% by weight of chloride ion and at most 0.0015% by weight of chlorine atoms.

EXAMPLE 1

0.15 g of bis(nonylphenyl) hydrogen phosphite and 2.0 g of tris(2,4-di-t-butylphenyl) phosphite were mixed with 10 kg of polycarbonate A prepared in 1) by Henschel mixer, and then granulated by extruder. The granulated sample was injection molded to make a test piece. This test piece was subjected to heat resistance, hot-water resistance and recycling tests and the results are shown in Table 1.

EXAMPLES 2-7

Test pieces made using the polycarbonates as shown in Table 1 with the additives as shown in Table 1 were evaluated in the same manner as in Example 1. The results are shown in Table 1.

COMPARATIVE EXAMPLES 1-3

Test pieces made using the polycarbonates as shown in Table 1 with the additives as shown in Table 1 were evaluated in the same manner as in Example 1. The results are shown in Table 1.

EXAMPLES 8-10

COMPARATIVE EXAMPLES 4-8

Test pieces made using the polycarbonates as shown in Table 2 with the additives as shown in Table 2 were evaluated in the same manner as in Example 1. The results are shown in Table 2.

EXAMPLES 11-13

COMPARATIVE EXAMPLES 9-12

Test pieces made using the polycarbonates as shown in Table 3 with the additives as shown in Table 3 were evaluated in the same manner as in Example 1. The results are shown in Table 3.

The abbreviations in Tables 1-3 mean the following compounds.
BNP = bis(nonylphenyl) hydrogen phosphite
TNP = tris(nonylphenyl) phosphite
P-168 = tris(2,4-di-t-butylphenyl) phosphite
BPP = bisphenyl hydrogen phosphite
EPQ = tetrakis(2,4-di-t-butylphenyl)-4,4'-biphenylene phosphonite
Irganox 1010 = pentaerythrityl-tetrakis[3-(3,5-di-t-butyl-4-hydroxyphenyl) propionate]
Irganox 1076 = octadecyl-3-(3,5-di-t-butyl-4-hydroxyphenyl) propionate
BBP = bis(2,4-di-t-butylphenyl) hydrogen phosphite

TABLE 1

| | | Additives | | | Color | Heat resistance test (140° C.) 300 hr | |
|---|---|---|---|---|---|---|---|
| | Polycarbonate | Phosphorous acid diester (g) | Phenolic oxidant (g) | Phosphorous acid triester or organic (g) | 0 hr b* | b* | Elongation retention rate (%) |
| Example 1 | A 10 kg | BNP 0.15 g | — | P-168 2.0 g | 3.5 | 4.4 | 82 |
| Example 2 | A 10 kg | BNP 0.15 g | Irganox 1076 1.0 g | — | 3.6 | 4.2 | 93 |
| Example 3 | A 10 kg | BNP 0.15 g | Irganox 1076 1.0 g | P-168 1.0 g | 3.5 | 4.1 | 95 |
| Example 4 | B 10 kg | BNP 0.10 g | — | TNP 0.20 g | 3.8 | 4.5 | 95 |
| Example 5 | B 10 kg | BPP 0.05 g | Irganox 1010 0.50 g | — | 3.8 | 4.8 | 94 |
| Example 6 | C 10 kg | BPP 0.10 g | — | EPQ 2.0 g | 3.6 | 4.4 | 80 |
| Example 7 | C 10 kg | BPP 0.10 g | Irganox 1010 0.50 g | P-168 1.5 g | 3.6 | 4.3 | 75 |
| Comparative Example 1 | D 10 kg | BNP 0.15 g | — | P-168 2.0 g | 4.0 | 6.0 | 80 |
| 2 | E 10 kg | BPP 0.10 g | — | EPQ 2.0 g | 4.0 | 6.0 | 70 |
| 3 | F 10 kg | BNP 0.15 g | — | P-168 2.0 g | 5.2 | 8.2 | 65 |

| | Heat resistance test (140° C.) 1000 hr | | Hot-water resistance test (in boiling water) | | | | Izod (kg · cm/cm) | | Recycling molding at 5th recycling of 100% b* |
|---|---|---|---|---|---|---|---|---|---|
| | | | 70 hr | | 300 hr | | | | |
| | b* | Elongation retention rate (%) | Mw retention rate (%) | Elongation retention rate (%) | Mw retention rate (%) | Elongation retention rate (%) | 0 hr | 100 hr | |
| Example 1 | 7.3 | 65 | 98 | 88 | 92 | 71 | 94 | 95 | 11.9 |
| Example 2 | 7.2 | 77 | 99 | 87 | 93 | 70 | 95 | 98 | 11.8 |
| Example 3 | 7.0 | 78 | 99 | 88 | 92 | 68 | 95 | 97 | 11.5 |
| Example 4 | 7.8 | 78 | 97 | 89 | 91 | 75 | 104 | 104 | 12.9 |
| Example 5 | 8.2 | 81 | 99 | 92 | 90 | 73 | 104 | 105 | 12.4 |
| Example 6 | 7.3 | 58 | 96 | 70 | 85 | 58 | 88 | 72 | 12.3 |
| Example 7 | 7.1 | 55 | 97 | 68 | 84 | 55 | 87 | 70 | 12.1 |
| Comparative Example 1 | 10.3 | 60 | 93 | 83 | 68 | 65 | 90 | 73 | 19.3 |
| 2 | 12.5 | 48 | 80 | 62 | 50 | 40 | 85 | 20 | 19.2 |
| 3 | 25.0 | 40 | 81 | 30 | 64 | 20 | 87 | 5 | 27.8 |
| | | | Craze occurred | | Craze occurred | | Craze occurred | | |

Note:
b*: Values obtained by measuring according to aforementioned CIELAB method are shown.

TABLE 2

| | | Additives | | | Color | Heat resistance test (140° C.) 300 hr | |
|---|---|---|---|---|---|---|---|
| | Polycarbonate | Phosphorous acid diester (g) | Phenolic oxidant (g) | Phosphorous acid triester or organic (g) | 0 hr b* | b* | Elongation retention rate (%) |
| Example 8 | G 10 kg | BBP 0.20 g | Irganox 1076 1.0 g | TNP 1.0 g | 3.7 | 4.7 | 88 |

TABLE 2-continued

| | | | | | | | |
|---|---|---|---|---|---|---|---|
| Example 9 | H 10 kg | BNP 0.35 g | Irganox 1076 0.50 g | P-168 0.50 g | 3.5 | 4.5 | 80 |
| Example 10 | I 10 g | BPP 0.50 g | — | EPQ 2.0 g | 3.7 | 4.7 | 83 |
| Comparative Example 4 | A 10 kg | BNP 0.15 g | — | — | 3.8 | 4.7 | 75 |
| Comparative Example 5 | A 10 kg | — | — | P-168 2.0 g | 4.0 | 6.5 | 73 |
| Comparative Example 6 | A 10 kg | — | Irganox 1076 1.0 g | — | 4.1 | 5.9 | 65 |
| Comparative Example 7 | A 10 kg | BNP 0.03 g | — | TNP 1.0 g | 4.0 | 5.5 | 78 |
| Comparative Example 8 | A 10 kg | BNP 2.0 g | — | TNP 1.0 g | 4.5 | 6.1 | 77 |

| | Heat resistance test (140° C.) 1000 hr | | Hot-water resistance test (in boiling water) | | | | Izod (kg · cm/cm) | | Recycling molding at 5th recycling of 100% b* |
|---|---|---|---|---|---|---|---|---|---|
| | | | 70 hr | | 300 hr | | | | |
| | b* | Elongation retention rate (%) | Mw retention rate (%) | Elongation retention rate (%) | Mw retention rate (%) | Elongation retention rate (%) | 0 hr | 100 hr | |
| Example 8 | 8.3 | 65 | 98 | 87 | 92 | 70 | 92 | 89 | 13.1 |
| Example 9 | 7.7 | 60 | 97 | 81 | 93 | 67 | 89 | 87 | 13.3 |
| Example 10 | 8.2 | 70 | 92 | 85 | 92 | 62 | 94 | 85 | 13.7 |
| Comparative Example 4 | 8.5 | 58 | 100 | 86 | 94 | 71 | 94 | 95 | 14.7 |
| Comparative Example 5 | 17.3 | 52 | 85 | 55 Craze occurred | 70 | 40 Craze occurred | 94 | 30 Craze occurred | 21.0 |
| Comparative Example 6 | 21.0 | 47 | 85 | 71 | 78 | 50 | 92 | 45 | 19.1 |
| Comparative Example 7 | 9.3 | 60 | 95 | 75 | 66 | 52 Craze occurred | 94 | 80 | 15.7 |
| Comparative Example 8 | 10.5 | 60 | 89 | 81 | 61 Craze occurred | 63 | 93 | 70 | 22.4 |

TABLE 3

| | | Additives | | | | Heat resistance test (140° C.) 300 hr | |
|---|---|---|---|---|---|---|---|
| | Polycarbonate | Phosphorous acid diester (g) | Phenolic oxidant (g) | Phosphorous acid triester or organic (g) | Color 0 hr b* | b* | Elongation retention rate (%) |
| Example 11 | B 10 kg | BNP 0.25 g | Irganox 1010 0.10 g | — | 3.8 | 4.6 | 86 |
| Example 12 | B 10 kg | BPP 0.10 g | Irganox 1010 8.0 g | — | 3.8 | 4.4 | 86 |
| Example 13 | I 10 kg | BBP 0.20 g | Irganox 1076 1.0 g | TNP 1.0 g | 3.6 | 4.5 | 85 |
| Comparative Example 9 | D 10 kg | — | — | P-168 5.0 g | 4.2 | 7.0 | 75 |
| Comparative Example 10 | A 10 kg | BNP 0.15 g | — | P-168 15.0 g | 3.8 | 4.8 | 80 |
| Comparative Example 11 | A 10 kg | BNP 0.10 g | Irganox 1010 15.0 g | — | 3.9 | 5.2 | 70 |
| Comparative Example 12 | J 10 kg | BNP 0.15 g | — | EPQ 2.0 g | 3.9 | 5.7 | 75 |

| | Heat resistance test (140° C.) 1000 hr | | Hot-water resistance test (in boiling water) | | | | Izod (kg · cm/cm) | | Recycling molding at 5th recycling of 100% b* |
|---|---|---|---|---|---|---|---|---|---|
| | | | 70 hr | | 300 hr | | | | |
| | b* | Elongation retention rate (%) | Mw retention rate (%) | Elongation retention rate (%) | Mw retention rate (%) | Elongation retention rate (%) | 0 hr | 100 hr | |
| Example 11 | 8.3 | 68 | 99 | 88 | 95 | 70 | 105 | 104 | 13.1 |
| Example 12 | 8.2 | 72 | 98 | 86 | 96 | 70 | 105 | 104 | 13.7 |
| Example 13 | 8.1 | 72 | 97 | 81 | 94 | 63 | 94 | 97 | 12.9 |
| Comparative Example 9 | 20.8 | 58 | 80 | 58 | 60 Craze occurred | 45 | 90 | 30 | 24.3 |
| Comparative Example 10 | 9.0 | 58 | 72 Craze occurred | 32 | 58 Craze occurred | 20 | 93 | 32 | 14.1 |
| Comparative Example 11 | 12.1 | 55 | 90 | 86 | 88 | 65 | 95 | 90 | 18.2 |
| Comparative | 9.6 | 65 | 94 | 85 | 74 | 70 | 90 | 67 | 16.1 |

INDUSTRIAL APPLICABILITY

The present invention provides a stabilized composition of an aromatic polycarbonate, which is a kind of engineering plastics. This stabilized aromatic polycarbonate is a very excellent material in that not only molded products made therefrom are improved in hot water resistance, steam resistance and coloration caused by use of them for a long time under bad conditions, but also substantially no coloration occurs even after recycling molding. Accordingly, engineering plastics are provided which are extremely suitable for the present conditions under which recycling use of the plastics is natural from the viewpoints of environmental protection and conservation of resources.

We claim:

1. A stabilized aromatic polycarbonate composition comprising 100 parts by weight of an aromatic polycarbonate substantially free from chlorine atoms,
   from 0.0005-0.015 part by weight of at least one compound selected from the group consisting of a phosphorous acid diester and a phosphorous acid monoester as component (a) and
   from 0.0005-0.1 part by weight of at least one compound selected from a phenolic antioxidant, a phosphorous acid triester and an organic phosphonite as component (b).

2. A composition according to claim 1, wherein component (a) is a phosphorous acid diester.

3. A composition according to claim 1 or 2, wherein a phenolic antioxidant and a phosphorous acid triester and/or an organic phosphonite comprised component (b).

4. A composition according to claim 1 or 2, wherein component (b) is a phenolic antioxidant.

5. A composition according to claim 1 or 2, wherein component (b) is a phosphorous acid triester.

6. A composition according to claim 1 or 2, wherein component (b) is an organic phosphonite.

7. A composition according to claim 1, wherein the phosphorous acid diester is an aromatic phosphorous acid diester.

8. A composition according to claim 1, wherein the aromatic polycarbonate containing substantially no chlorine atom is a highly crystalline polycarbonate.

9. A composition according to claims 1, wherein the aromatic polycarbonate containing substantially no chlorine atom has an absorbance of lower than 0.01 to 400 nm which is measured by a spectrophotometer using a solution of 1.0 g of said polycarbonate in 7 ml of methylene chloride which is charged in a cell of 1 cm in optical path length.

10. A process for producing a stabilized aromatic polycarbonate composition which is characterized by mixing 100 parts by weight of an aromatic polycarbonate containing substantially no chlorine atom with (a) 0.0005-0.015 part by weight of at least one compound selected from the group consisting of a phosphorous acid diester and a phosphorous acid monoester and (b) 0.0005-0.1 part by weight of at least one compound selected from a phenolic antioxidant, a phosphorous acid triester and an organic phosphonite.

11. A process according to claim 10, wherein an aromatic polycarbonate obtained by solid-phase polymerization of a crystalline aromatic polycarbonate prepolymer is the aromatic polycarbonate containing substantially no chlorine atom.

12. A composition according to claim 6, wherein the phosphorous acid diester is an aromatic phosphorous acid diester.

13. A stabilized aromatic polycarbonate composition wherein the aromatic polycarbonate is substantially free from chlorine atoms and which, per 100 parts by way of the aromatic polycarbonate, consists essentially of (a) from 0.005 to 0.015 part by weight of at least one compound selected from the group consisting of phosphorous acid diester and a phosphorous acid monoester and (b) from 0.005 to 0.01 part by weight of at least one compound selected from the group consisting of a phenolic antioxidant, a phosphorous acid triester and an organic phosphonite.

* * * * *